(12) United States Patent
Munier et al.

(10) Patent No.: US 11,617,193 B2
(45) Date of Patent: Mar. 28, 2023

(54) CONTROL SIGNALLING FOR A REPEATED TRANSMISSION

(71) Applicant: Telefonaktiebolaget LM Ericsson (publ), Stockholm (SE)

(72) Inventors: Florent Munier, Västra Frölunda (SE); Niklas Andgart, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 47 days.

(21) Appl. No.: 17/054,350

(22) PCT Filed: May 10, 2019

(86) PCT No.: PCT/EP2019/062089
§ 371 (c)(1),
(2) Date: Nov. 10, 2020

(87) PCT Pub. No.: WO2019/215340
PCT Pub. Date: Nov. 14, 2019

(65) Prior Publication Data
US 2021/0250972 A1 Aug. 12, 2021

Related U.S. Application Data
(60) Provisional application No. 62/670,298, filed on May 11, 2018.

(51) Int. Cl.
*H04W 72/12* (2009.01)
*H04W 72/1273* (2023.01)
(Continued)

(52) U.S. Cl.
CPC ......... *H04W 72/1273* (2013.01); *H04L 1/189* (2013.01); *H04W 72/042* (2013.01); *H04W 72/1236* (2013.01)

(58) Field of Classification Search
CPC ........ H04L 1/08; H04L 1/189; H04W 72/042; H04W 72/1236; H04W 72/1273
See application file for complete search history.

(56) References Cited

U.S. PATENT DOCUMENTS 11,122,553 B2 * 9/2021 Ye .............................. H04L 1/08
11,464,039 B2 * 10/2022 Hwang ..................... H04L 1/08
(Continued)

FOREIGN PATENT DOCUMENTS

| | | |
|---|---|---|
| RU | 2 643 660 C1 | 2/2018 |
| RU | 2 653 232 C2 | 5/2018 |
| WO | 2016 128930 A1 | 8/2016 |

OTHER PUBLICATIONS

Examination Report issued by Intellectual Property India for Application No. 202047053323—dated Dec. 16, 2021.
(Continued)

*Primary Examiner* — Shah M Rahman
(74) *Attorney, Agent, or Firm* — Baker Botts L.L.P.

(57) ABSTRACT

Methods and apparatuses are disclosed for enabling repeated transmissions. In one embodiment, a method for communicating with a wireless device includes determining a configuration for a number of repetitions of a transmission, the configuration corresponding to a Downlink Control Information (DCI) field; and communicating the configuration to the wireless device. In another embodiment, a method includes receiving a configuration for a number of repetitions of a transmission, the configuration corresponding to a Downlink Control Information (DCI) field.

22 Claims, 7 Drawing Sheets

(51) Int. Cl.
*H04L 1/1867* (2023.01)
*H04W 72/04* (2023.01)

(56) References Cited

U.S. PATENT DOCUMENTS

| | | | |
|---|---|---|---|
| 2011/0228863 A1* | 9/2011 | Papasakellariou | H04W 72/1263 375/259 |
| 2013/0114658 A1* | 5/2013 | Davydov | H04W 52/242 375/224 |
| 2015/0181576 A1* | 6/2015 | Papasakellariou | H04L 5/0053 370/329 |
| 2016/0242206 A1* | 8/2016 | Ohlsson | H04W 72/1289 |
| 2016/0337157 A1 | 11/2016 | Papasakellariou | |
| 2016/0353440 A1 | 12/2016 | Lee et al. | |
| 2017/0181009 A1* | 6/2017 | Wong | H04L 1/08 |
| 2017/0264399 A1* | 9/2017 | Li | H04L 1/0072 |
| 2017/0265174 A1 | 9/2017 | Wang et al. | |
| 2018/0020382 A1* | 1/2018 | Kim | H04W 36/0055 |
| 2018/0159655 A1* | 6/2018 | Papasakellariou | H04L 1/189 |
| 2018/0199359 A1* | 7/2018 | Cao | H04W 72/14 |
| 2018/0219649 A1* | 8/2018 | Ying | H04L 1/08 |
| 2018/0279274 A1* | 9/2018 | Sun | H04L 1/1864 |
| 2018/0279297 A1* | 9/2018 | Nogami | H04L 1/1854 |
| 2018/0279327 A1* | 9/2018 | Ying | H04L 5/0053 |
| 2018/0323909 A1* | 11/2018 | Ying | H04L 1/1887 |
| 2019/0182824 A1* | 6/2019 | Chatterjee | H04W 74/0833 |
| 2019/0222970 A1* | 7/2019 | Shan | H04L 1/1848 |
| 2019/0289591 A1* | 9/2019 | Lin | H04L 5/0048 |
| 2019/0372719 A1* | 12/2019 | Talarico | H04W 72/042 |
| 2020/0022218 A1* | 1/2020 | Chang | H04W 72/042 |
| 2020/0059322 A1* | 2/2020 | Lei | H04L 1/1671 |
| 2021/0045146 A1* | 2/2021 | Beale | H04L 5/0037 |
| 2021/0160916 A1* | 5/2021 | Zhang | H04L 1/1816 |
| 2021/0176018 A1* | 6/2021 | Bai | H04L 1/1864 |

OTHER PUBLICATIONS

3GPP TS 36.212 v15.3.0; Technical Specification; 3rd Generation Partnership Project; Technical Specification Group Radio Access Network; Evolved Universal Terrestrial Radio Access (E-UTRA); Multiplexing and channel coding (Release 15)—Sep. 2018.

3GPP TSG RAN WG1 NR Meeting #90bis; Prague, Czech Republic; Source: Huawei, HiSilicon; Title: DCI design for URLLC (R1-1717088)—Oct. 9-13, 2017.

PCT Notification of Transmittal of the International Search Report and the Written Opinion of the International Searching Authority, or the Declaration issued for International application No. PCT/EP2019/062089.

Official Action issued by the Russian FIIR for Application No. 2020140443/07—dated Jul. 12, 2021.

* cited by examiner

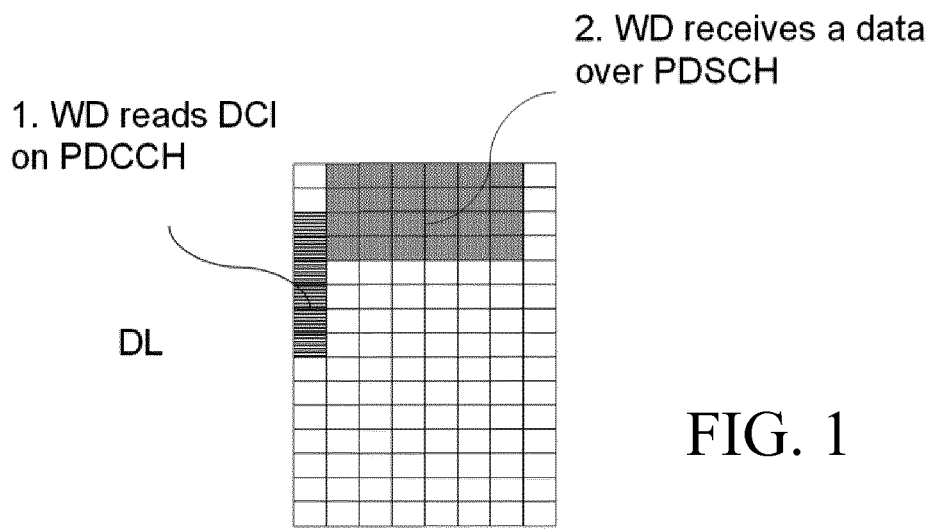
Downlink resource allocation
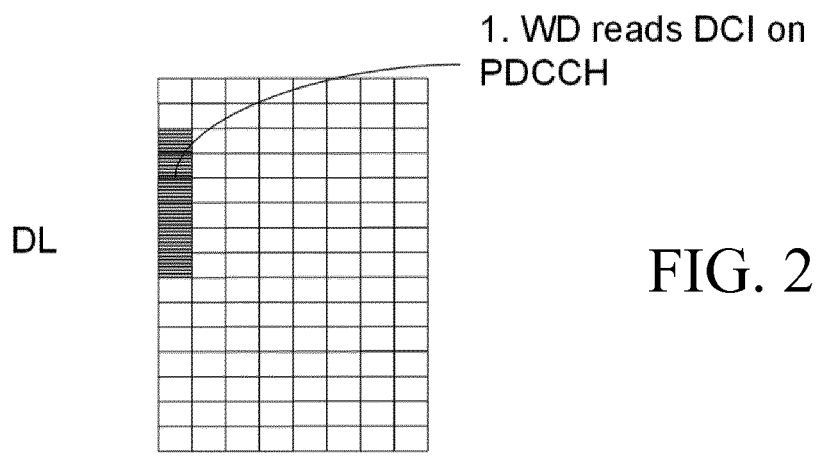
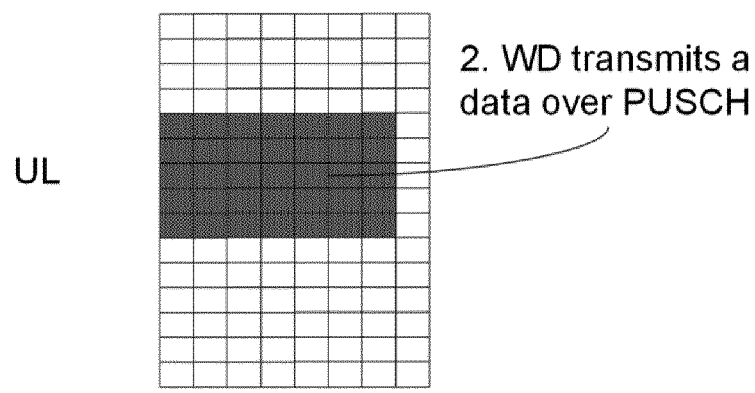
Uplink resource allocation

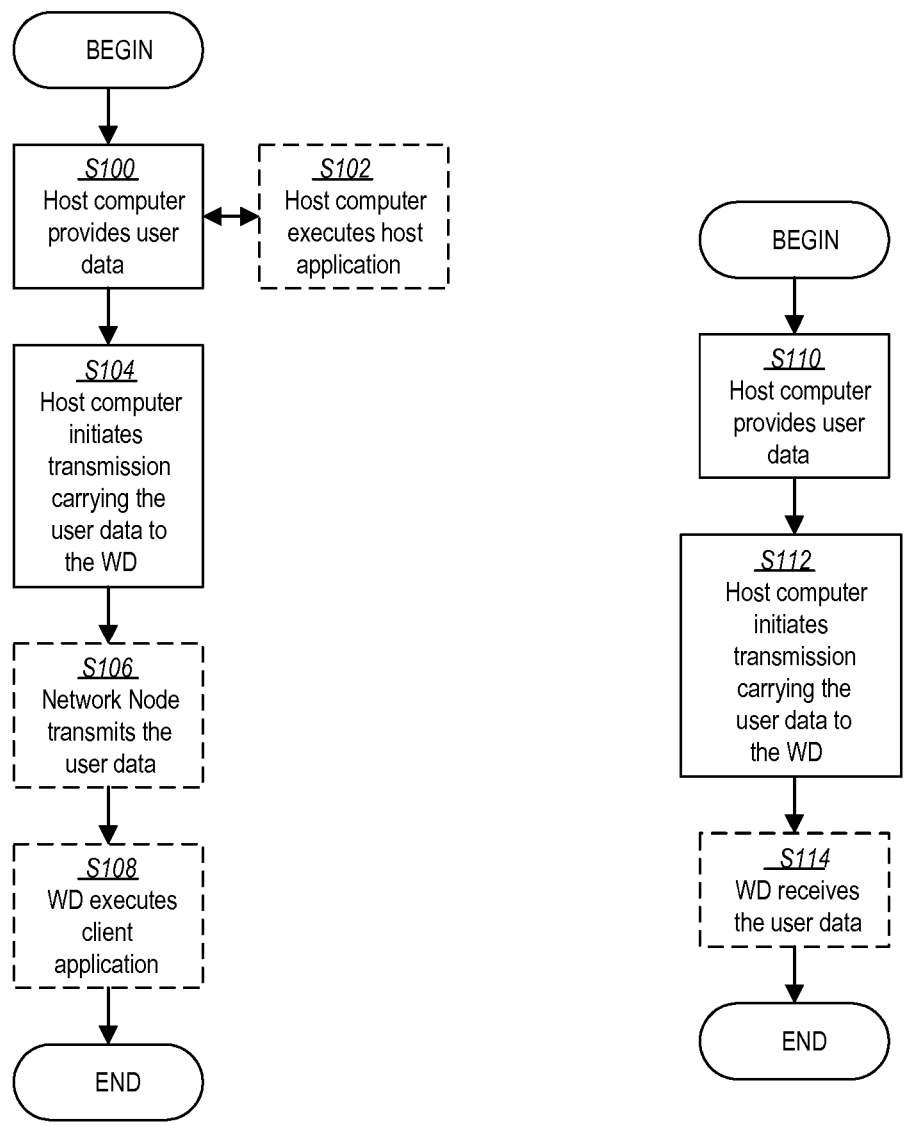

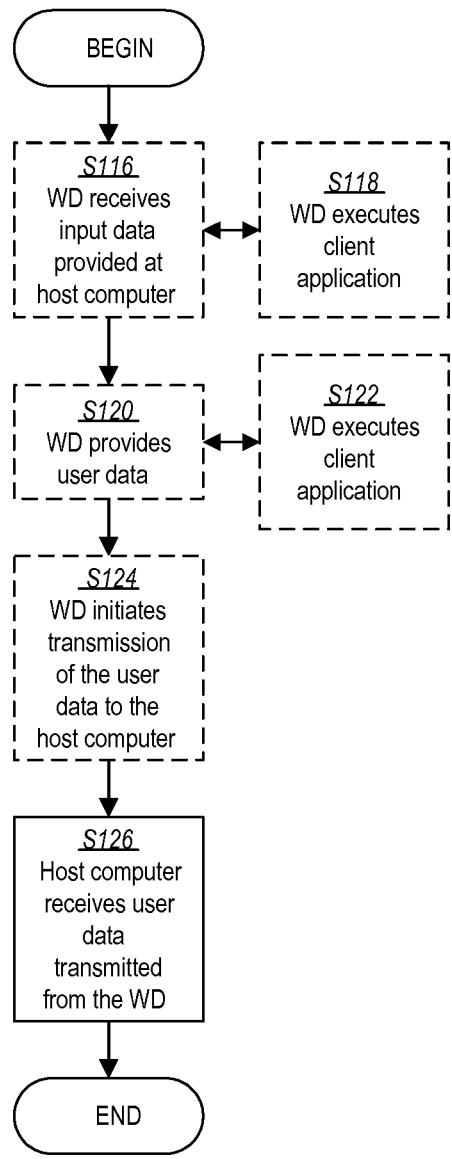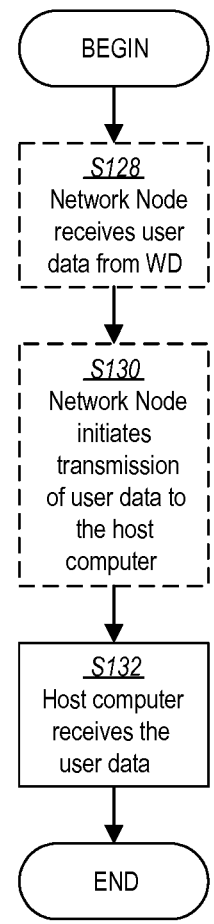
FIG. 7
FIG. 8

CONTROL SIGNALLING FOR A REPEATED TRANSMISSION

PRIORITY

This nonprovisional application is a U.S. National Stage Filing under 35 U.S.C. § 371 of International Patent Application Serial No. PCT/EP2019/062089 filed May 10, 2019 and entitled "CONTROL SIGNALLING FOR A REPEATED TRANSMISSION" which claims priority to U.S. Provisional Patent Application No. 62/670,298 filed May 11, 2018 both of which are hereby incorporated by reference in their entirety.

TECHNICAL FIELD

The present disclosure relates to wireless communications, and in particular, to control signaling for enabling repeated transmissions.

BACKGROUND

In Long Term Evolution (LTE) and/or New Radio (NR) (NR is also known as "5G") communication networks, data transmission for terminals (e.g., wireless devices and/or user equipment (UEs)) and network nodes (e.g., e/gNodeB) is controlled by the nodes using grants containing, among other things, the details in the allocated spectrum resource and the modulation and coding to transmit over that resource. The downlink (DL) and uplink (UL) assignments are signaled in the downlink control information (DCI). DCI messages are typically sent over Physical Downlink Control Channel (PDCCH) or a short PDCCH (sPDCCH). An example of this process in DL and UL is shown at FIGS. 1 and 2, respectively.

A DCI may include a variety of fields and different set of fields may be organized in different formats. For example, DCI0 includes the set of fields for sending an uplink assignment. In each format, it may the case that some fields can be optional and configured on an as-needed basis.

In wireless networks, such as for example LTE and NR, a framework for ultra-reliable, low-latency communication (e.g. URLLC) is being considered. In such framework, wireless devices may be expected to transmit at very low error rate (e.g., on the order of 0.001 percent) within very tight latency bounds, as compared to existing latency bounds (e.g., at most 1 millisecond (ms)). In URLLC, the payload may be expected to be very small (e.g., on the order of 100s of bits (one use case is 32 bytes)), as compared to existing conventional communication frameworks.

SUMMARY

Some embodiments advantageously provide methods and apparatuses for control signaling for enabling repetitions, for example in high reliability and/or low latency communications.

According to one aspect of the present disclosure, a network node configured to communicate with a wireless device and to schedule a plurality of resources in a single scheduling message for a repeated transmission, is provided. The network node comprises processing circuitry, the processing circuitry configured to determine a configuration for a number of repetitions of the transmission, the configuration corresponding to a Downlink Control Information, DCI, field; and communicate the configuration to the wireless device.

In some embodiments of this aspect, the processing circuitry is further configured to communicate the configuration via Radio Resource Control, RRC, signaling. In some embodiments of this aspect, the configuration comprises configuring a number of repetitions corresponding to a value in the DCI field. In some embodiments of this aspect the number of repetitions is configured in the wireless device and is selected when said corresponding value in the DCI field is signaled to the wireless device. In some embodiments of this aspect, the configuration corresponds to a 1-1 mapping of a value in the DCI field to a predefined number of repetitions. In some embodiments of this aspect the configuration comprises a combination of at least one, 1-1 mapping of a value in the DCI field to a predefined number of repetitions and configuring at least one number of repetitions corresponding to a respective value in the DCI field. In some embodiments of this aspect, the processing circuitry is further configured to communicate a DCI message, the DCI message comprising the value in the DCI field. In some embodiments of this aspect, if a length of the DCI field is n bits, which provides $2^n$ different numbers of repetitions configurable by the network node, and at least one of the configurable number of repetitions is configured via Radio Resource Control, RRC, signaling. In some embodiments of this aspect, the processing circuitry is further configured to communicate the configuration via Radio Resource Control, RRC, signaling, the RRC signaling comprising at least a first parameter and a second parameter configuring the number of repetitions of a downlink, DL, transmission and an uplink, UL, transmission, respectively. In some embodiments, the processing circuitry further configured to communicate the configuration via Radio Resource Control, RRC, signaling, the RRC signaling comprising a parameter configuring the number of repetitions of one of: a Physical Downlink Shared Channel, PDSCH, transmission and a Physical Uplink Shared Channel, PUSCH, transmission. In some embodiments of this aspect, the configuration of the number of repetitions is associated with a table, the table mapping values of the DCI field to repetition values.

According to another aspect of the present disclosure, a method in a network node configured to communicate with a wireless device and schedule a plurality of resources in a single scheduling message for a repeated transmission is provided. The method comprises determining a configuration for indicating a number of repetitions of the transmission, the configuration corresponding to a Downlink Control Information, DCI, field. The method includes communicating the configuration the wireless device.

In some embodiments of this aspect, the method further comprises communicating the configuration via Radio Resource Control, RRC, signaling. In some embodiments of this aspect, the configuration comprises configuring a number of repetitions corresponding to a value in the DCI field. In some embodiments of this aspect, the number of repetitions is configured in the wireless device and is selected when said corresponding value in the DCI field is signaled to the wireless device. In some embodiments of this aspect, the configuration corresponds to a 1-1 mapping of a value in the DCI field to a predefined number of repetitions. In some embodiments of this aspect, the configuration comprises a combination of at least one, 1-1 mapping of a value in the DCI field to a predefined number of repetitions and configuring at least one number of repetitions corresponding to a respective value in the DCI field. In some embodiments of this aspect, the method further comprises communicating a DCI message, the DCI message comprising the value in the DCI field. In some embodiments of this aspect, if a length of the DCI field is n bits, which provides $2^n$ different numbers of repetitions which are configurable and at least one of the configurable number of repetitions is configured via Radio Resource Control, RRC, signaling. In some embodiments of this aspect, the communicating the configuration further comprises communicating the configuration via Radio Resource Control, RRC, signaling, the RRC signaling comprising at least a first parameter and a second parameter configuring the number of repetitions of a downlink, DL, transmission and an uplink, UL, transmission, respectively. In some embodiments, processing circuitry is further configured to communicate the configuration via Radio Resource Control, RRC, signaling, the RRC signaling comprising a parameter configuring the number of repetitions of one of: a Physical Downlink Shared Channel, PDSCH, transmission and a Physical Uplink Shared Channel, PUSCH, transmission. In some embodiments of this aspect, the configuration of the number of repetitions is associated with a table, the table mapping values of the DCI field to repetition values.

According to yet another aspect of the present disclosure, a wireless device configured to communicate with a network node scheduling a plurality of resources in a single scheduling message for a repeated transmission, is provided. The wireless device comprises processing circuitry and a radio interface in communication with the processing circuitry, the radio interface configured to receive a configuration for indicating a number of repetitions of the transmission, the configuration corresponding to a Downlink Control Information, DCI, field.

In some embodiments of this aspect, the radio interface is further configured to receive the configuration via Radio Resource Control, RRC, signaling. In some embodiments of this aspect, the configuration comprises configuring a number of repetitions corresponding to a value in the DCI field. In some embodiments of this aspect, the configuration corresponds to a 1-1 mapping of a value in the DCI field to a predefined number of repetitions. In some embodiments of this aspect, the configuration comprises a combination of at least one, 1-1 mapping of a value in the DCI field to a predefined number of repetitions and configuring at least one number of repetitions corresponding to a respective value in the DCI field. In some embodiments of this aspect, the radio interface is further configured to: receive a DCI message, the DCI message comprising the value in the DCI field; and receive a Physical Downlink Shared Channel, PDSCH, transmission; and the processing circuitry is configured to decode the Physical Downlink Shared Channel, PDSCH, transmission based at least in part on a determined number of repetitions of the transmission, wherein the number of repetitions is based on the value in the DCI field. In some embodiments of this aspect, the value in the DCI field indicates the number of repetitions of the transmission is the configured number of repetitions. In some embodiments of this aspect, if a length of the DCI field is n bits, this provides $2^n$ different numbers of repetitions which are configurable and at least one of the configurable number of repetitions is configured via Radio Resource Control, RRC, signaling. In some embodiments of this aspect, the radio interface is further configured to receive the configuration via Radio Resource Control, RRC, signaling, the RRC signaling comprising at least a first parameter and a second parameter configuring the number of repetitions of a downlink, DL, transmission and an uplink, UL, transmission, respectively. In some embodiments, the radio interface is further configured to receive the configuration via Radio Resource Control, RRC, signaling, the RRC signaling comprising a parameter configuring the number of repetitions of one of: a Physical Downlink Shared Channel, PDSCH, transmission and a Physical Uplink Shared Channel, PUSCH, transmission. In some embodiments of this aspect, the configuration is associated with a table, the table mapping values of the DCI field to repetition values.

According to yet another embodiment of the present disclosure, a method in a wireless device configured to communicate with a network node for a repeated transmission, is provided. The method comprises receiving a configuration for indicating a number of repetitions of the transmission, the configuration corresponding to a Downlink Control Information, DCI, field.

In some embodiments of this aspect, the receiving the configuration is via Radio Resource Control, RRC, signaling. In some embodiments of this aspect, the configuration comprises configuring a number of repetitions corresponding to a value in the DCI field. In some embodiments of this aspect, the configuration corresponds to a 1-1 mapping of a value in the DCI field to a predefined number of repetitions. In some embodiments of this aspect, the configuration comprises a combination of at least one, 1-1 mapping of a value in the DCI field to a predefined number of repetitions and configuring at least one number of repetitions corresponding to a respective value in the DCI field. In some embodiments of this aspect, the method further comprises receiving a DCI message, the DCI message comprising the value in the DCI field; and receiving and decoding a Physical Downlink Shared Channel, PDSCH, transmission based at least in part on a determined number of repetitions of the transmission, wherein the number of repetitions is based on the value in the DCI field. In some embodiments of this aspect, the value in the DCI field indicates the number of repetitions of the transmission is the configured number of repetitions. In some embodiments of this aspect, if a length of the DCI field is n bits, which provides $2^n$ different numbers of repetitions which are configurable and at least one of the configurable number of repetitions is configured via Radio Resource Control, RRC, signaling. In some embodiments of this aspect, the receiving the configuration is via Radio Resource Control, RRC, signaling, the RRC signaling comprising at least a first parameter and a second parameter configuring the number of repetitions of a downlink, DL, transmission and an uplink, UL, transmission, respectively. In some embodiments, the receiving the configuration is via Radio Resource Control, RRC, signaling, the RRC signaling comprising a parameter configuring the number of repetitions of one of: a Physical Downlink Shared Channel, PDSCH, transmission and a Physical Uplink Shared Channel, PUSCH, transmission. In some embodiments of this aspect, the configuration is associated with a table, the table mapping values of the DCI field to repetition values.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 illustrates an example of a downlink (DL) resource allocation;

FIG. 2 illustrates an example of an uplink (UL) resource allocation;

FIG. 5 is a flowchart illustrating an exemplary method implemented in a communication system including a host computer, a network node and a wireless device according to some embodiments of the present disclosure;

FIG. 6 is a flowchart illustrating an exemplary method implemented in a communication system including a host computer, a network node and a wireless device according to some embodiments of the present disclosure;

FIG. 7 is a flowchart illustrating an exemplary method implemented in a communication system including a host computer, a network node and a wireless device according to some embodiments of the present disclosure;

FIG. 8 is a flowchart illustrating an exemplary method implemented in a communication system including a host computer, a network node and a wireless device according to some embodiments of the present disclosure;

DETAILED DESCRIPTION

Figure 3:
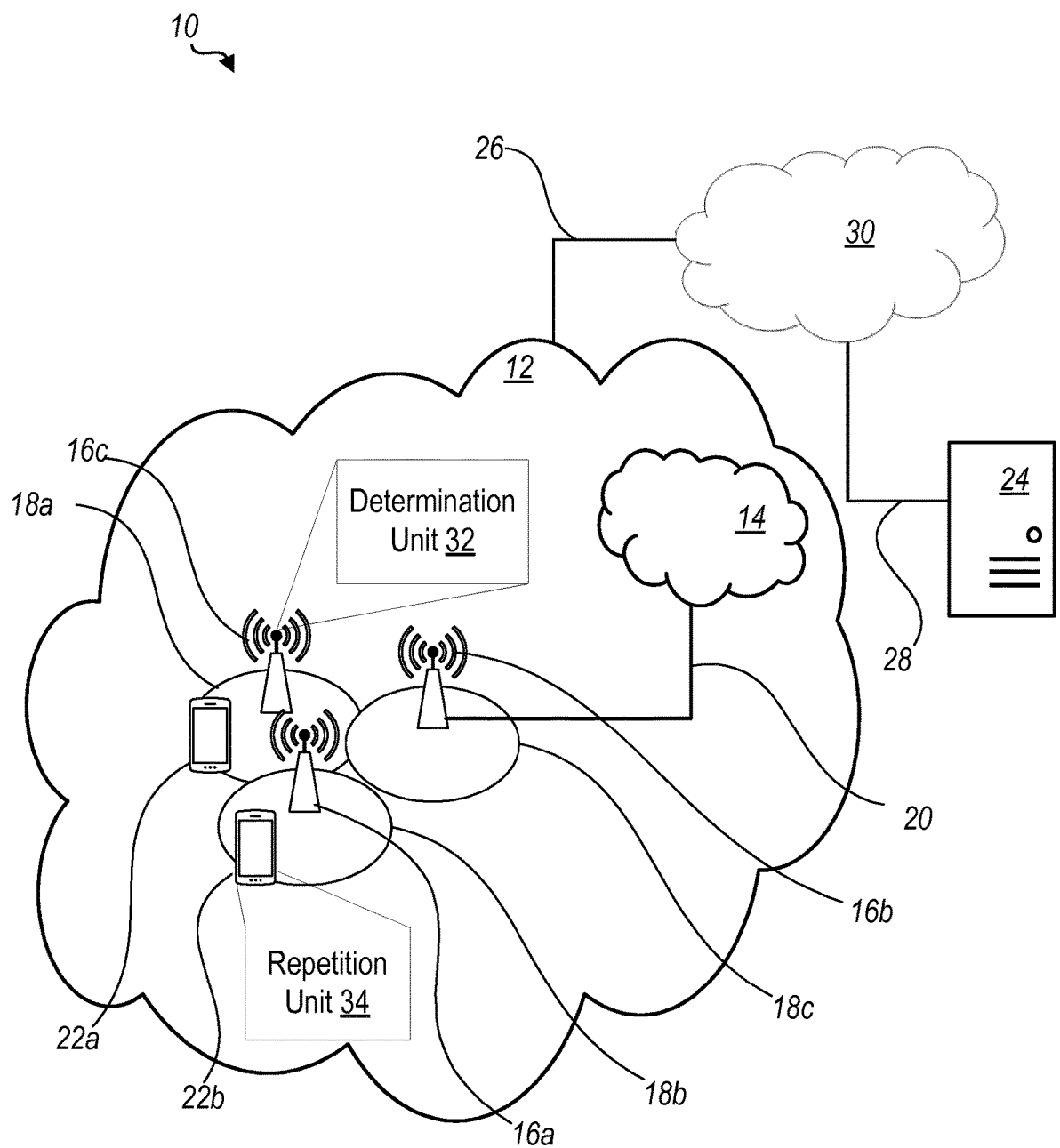
FIG. 3 is a schematic diagram of an exemplary network architecture illustrating a communication system connected via an intermediate network to a host computer according to the principles in the present disclosure.

Some embodiments advantageously provide methods and apparatuses for control signaling (e.g., radio resource control (RRC) signaling) for enabling unacknowledged repetitions of transmissions. Such transmission, e.g. a repeated transmission, is required in low latency and/or high reliability communications. Some embodiments provide an RRC notification of the repetition number field that may advantageously avoid having to create new Downlink Control Information (DCI) formats. Such creation of new DCI formats could disadvantageously increase the number of blind decodings for a wireless device, as compared to existing techniques. The network may have to resort to transmit multiple repetitions of the assignment e.g., of resources (either in the downlink or the uplink). The number of repetitions can be signaled dynamically, or semi-statically. To avoid designing a new DCI format, embodiments of the present disclosure may provide for the possibility of notifying the wireless device via e.g., RRC signaling of an existing, or predetermined/predefined repetition number field value. Thus, some embodiments may advantageously enable the network to use the field as an optional field in one or more existing DCI formats.

Before describing in detail exemplary embodiments, it is noted that the embodiments reside primarily in combinations of apparatus components and processing steps related to control signaling for enabling repetitions in low latency communications (e.g. URLLC) environments. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments described herein, the terms "schedule" and "assign" are used interchangeably and may be used to indicate a network node scheduling/assigning radio resources for a wireless device communication, such as, for example, resources for a Physical Downlink Shared Channel (PDSCH) transmission to the wireless device.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device, such as a UE or a radio network node.

In some embodiments, the non-limiting terms wireless device) or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for a control signaling (e.g., an RRC notification) of the repetition number field that may advantageously avoid having to create new DCI formats. Such creation of new DCI formats could disadvantageously increase the number of blind decodings for a wireless device, as compared to existing techniques.

Returning to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a determination unit 32 which is configured to determine a configuration for indicating a number of repetitions of a repeated transmission, the configuration corresponding to a Downlink Control Information, DCI, field; and communicate the configuration to the wireless device 22. In another embodiment, the network node 16 includes determination unit 32 configured to determine an indication of a number of repetitions for a transmission, the transmission being associated with the wireless device 22; and communicate the indication of the number of repetitions to the wireless device 22 via a Radio Resource Control (RRC) signaling. In some embodiments, the determination unit 32 may be hardware associated with the network node 16, such as processing circuitry discussed herein below for the network node 16, which may implement methods discussed herein below for the network node 16. In some embodiments, the determination unit 32 may be considered a determinator.

A wireless device 22 is configured to include a repetition unit 34 which is configured to receive a configuration for indicating a number of repetitions of a repeated transmission, the configuration corresponding to a Downlink Control Information, DCI, field. In another embodiment, wireless device 22 includes repetition unit 34 which is configured to receive a Radio Resource Control (RRC) signal including an indication; and recognize the indication as an indication of a number of repetitions for a transmission associated with the wireless device 22. In some embodiments, the repetition unit 34 may be hardware associated with the wireless device 22, such as processing circuitry discussed herein below for the wireless device 22, which may implement methods discussed herein below for the wireless device 22. In some embodiments, the repetition unit 34 may be a repetition indication recognizer.

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, and/or transmit to/receive from the network node 16 and or/the wireless device 22.

The communication system 10 further includes a network node 16 provided in a communication system 10 and comprising hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include determination unit 32 configured to determine a configuration for indicating a number of repetitions of a transmission, e.g. a repeated transmission, the configuration corresponding to a Downlink Control Information, DCI, field and communicate the configuration to the wireless device 22.

In some embodiments, the processing circuitry 68 is further configured to communicate the configuration via Radio Resource Control, RRC, signaling. In some embodiments, the configuration comprises configuring a number of repetitions corresponding to a value in the DCI field. In some examples the number of repetitions is configured in the wireless device and is selected when said corresponding value in the DCI field is signaled to the wireless device. In some embodiments, the configuration corresponds to a 1-1 mapping of a value in the DCI field to a predefined number of repetitions. In some examples, the configuration comprises a combination of at least one, 1-1 mapping of a value in the DCI field to a predefined number of repetitions and configuring at least one number of repetitions corresponding to a respective value in the DCI field. In some embodiments, the processing circuitry 68 is further configured to communicate a DCI message, the DCI message comprising the value in the DCI field. In some embodiments, if a length of the DCI field is n bits, the number of different numbers of repetitions configurable by the network node 16 is $2^n$ and at least one of the configurable number of repetitions is configured via Radio Resource Control, RRC, signaling. In some embodiments, the processing circuitry 68 is further configured to communicate the configuration via Radio Resource Control, RRC, signaling, the RRC signaling comprising at least a first parameter and a second parameter configuring the number of repetitions of a downlink, DL, transmission and an uplink, UL, transmission, respectively. In some embodiments, the processing circuitry 68 is further configured to communicate the configuration via Radio Resource Control, RRC, signaling, the RRC signaling comprising a parameter configuring the number of repetitions of either a Physical Downlink Shared Channel, PDSCH, transmission or a Physical Uplink Shared Channel, PUSCH, transmission. In some embodiments, the configuration of the number of repetitions is associated with a table, the table mapping values of the DCI field to repetition values. In other words, the table comprises predefined number of repetition values.

In another embodiment, network node 16 may include determination unit 32 which is configured to determine an indication of a number of repetitions for a transmission, the transmission being associated with the wireless device 22; and communicate (via e.g., radio interface 62) the indication of the number of repetitions to the wireless device 22 via a Radio Resource Control (RRC) signaling. In some embodiments, the indication of the number of repetitions indicates a default number of repetitions associated with a Downlink Control Information (DCI) field used for the low latency communications. In some embodiments, if a length of the DCI field is n bits, the number of repetitions configurable by the network node is $2^n$ and at least one of the configurable number of repetitions is configured by the RRC signaling. In some embodiments, the RRC signaling includes at least a first parameter and a second parameter configuring the number of repetitions for a downlink (DL) transmission and an uplink (UL) transmission, respectively. In some embodiments, the indication of the number of repetitions includes a plurality of repetition values each configurable by a Downlink Control Information (DCI) field. In some embodiments, the indication of the number of repetitions is implemented in a table, the table mapping values of a Downlink Control Information (DCI) field to a plurality of repetition values. In other words, the table comprises a plurality of predefined number of repetition values.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a repetition unit 34 configured to cause the radio interface 82 to receive a configuration for indicating a number of repetitions of a transmission, e.g. a repeated transmission, the configuration corresponding to a Downlink Control Information, DCI, field.

In some embodiments, the radio interface 82 is further configured to receive the configuration via Radio Resource Control, RRC, signaling. In some embodiments, the configuration comprises configuring a number of repetitions corresponding to a value in the DCI field. In some embodiments, the configuration corresponds to a 1-1 mapping of a value in the DCI field to a predefined number of repetitions. In some examples, the configuration comprises a combination of at least one, 1-1 mapping of a value in the DCI field to a predefined number of repetitions and configuring at least one number of repetitions corresponding to a respective value in the DCI field. In some embodiments, the radio interface 82 is further configured to: receive a DCI message, the DCI message comprising the value in the DCI field; and receive a Physical Downlink Shared Channel, PDSCH, transmission; and the processing circuitry 84 is configured to decode the Physical Downlink Shared Channel, PDSCH, transmission based at least in part on a determined number of repetitions of the transmission, wherein the number of repetitions is based on the value in the DCI field. In some examples, the value in the DCI field indicates the number of repetitions of the transmission is provided by the configured number of repetitions, for example signalled via RRC signaling. In some embodiments, if a length of the DCI field is n bits, the number of different numbers of repetitions configurable by the network node 16 is $2^n$ and at least one of the configurable number of repetitions is configured via Radio Resource Control, RRC, signaling. In some embodiments, the radio interface 82 is further configured to receive the configuration via Radio Resource Control, RRC, signaling, the RRC signaling comprising at least a first parameter and a second parameter configuring the number of repetitions of a downlink, DL, transmission and an uplink, UL, transmission, respectively. In some embodiments, the radio interface 82 is further configured to receive the configuration via Radio Resource Control, RRC, signaling, the RRC signaling comprising a parameter configuring the number of repetitions of either a Physical Downlink Shared Channel, PDSCH, transmission or a Physical Uplink Shared Channel, PUSCH, transmission. In some embodiments, the configuration associated with a table, the table mapping values of the DCI field to repetition values.

In another embodiment, wireless device 22 includes repetition unit 34 which is configured to receive (via e.g., radio interface 82) a Radio Resource Control (RRC) signal including an indication; and recognize the indication as an indication of a number of repetitions for a transmission associated with the wireless device 22. In some embodiments, the indication of the number of repetitions indicates a default number of repetitions associated with a Downlink Control Information (DCI) field used for the low latency communications. In some embodiments, if a length of the DCI field is n bits, the number of different numbers of repetitions configurable by the network node is $2^n$ and at least one of the configurable number of repetitions is configured by the RRC signaling. In some embodiments, the received RRC signal includes at least a first parameter and a second parameter configuring the number of repetitions for a downlink (DL) transmission and an uplink (UL) transmission, respectively. In some embodiments, the indication of the number of repetitions includes a plurality of repetition values each configurable by a Downlink Control Information (DCI) field. In some embodiments, the indication of the number of repetitions is implemented in a table stored in a memory (e.g., memory 88) of the wireless device 22, the table mapping values of a Downlink Control Information (DCI) field to a plurality of repetition values.

Figure 4:
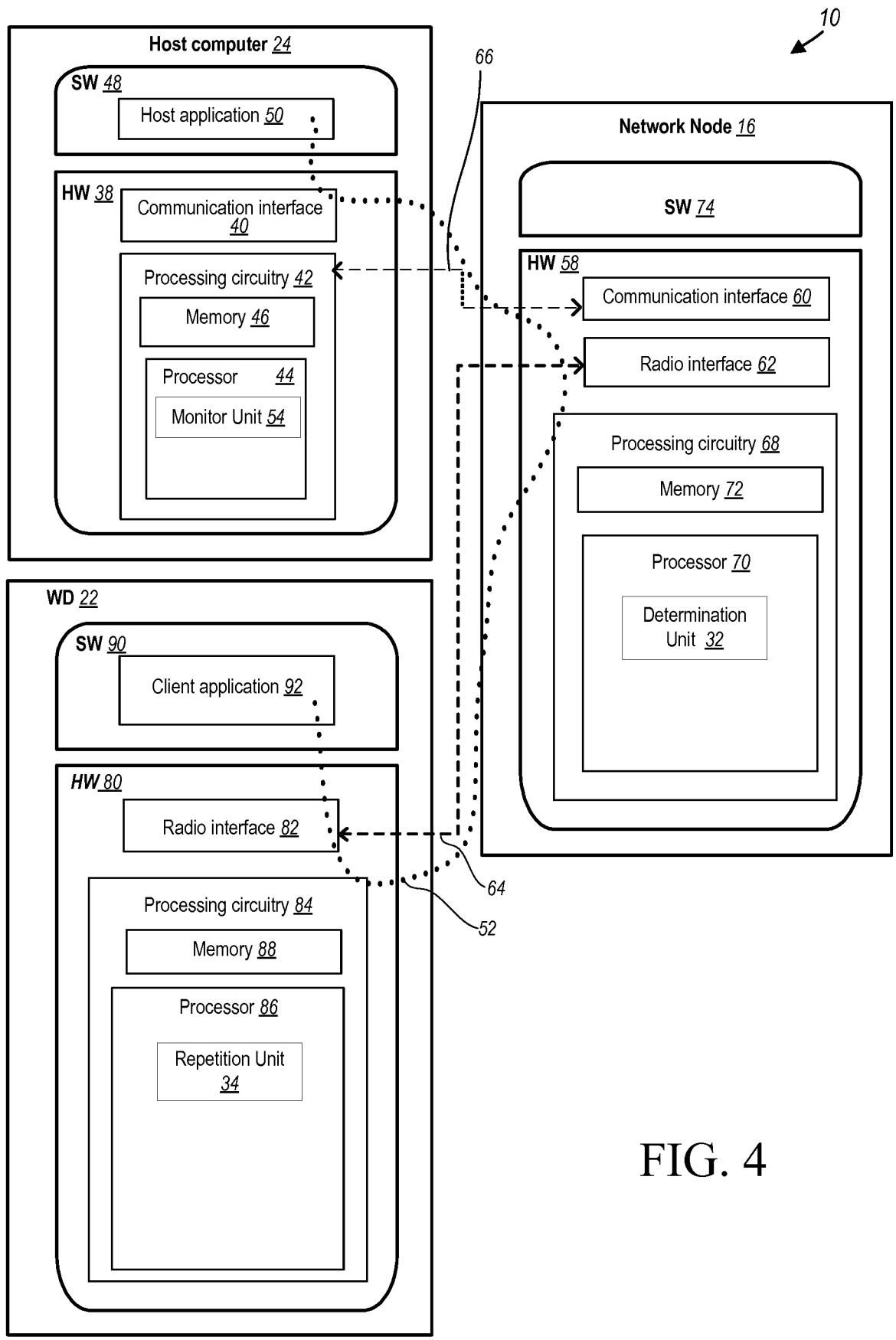
FIG. 4 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as determination unit 32, and repetition unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a wireless device 22, which may be those described with reference to FIG. 4. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the wireless device 22 (block S104). In an optional third step, the network node 16 transmits to the wireless device 22 the user data which was carried in the transmission that the host computer 24 initiated, in accordance with the teachings of the embodiments described throughout this disclosure (block S106). In an optional fourth step, the wireless device 22 executes a client application, such as, for example, the client application 114, associated with the host application 50 executed by the host computer 24 (block S108).

FIG. 6 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the wireless device 22 (block S112). The transmission may pass via the network node 16, in accordance with the teachings of the embodiments described throughout this disclosure. In an optional third step, the wireless device 22 receives the user data carried in the transmission (block S114).

FIG. 7 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, the wireless device 22 receives input data provided by the host computer 24 (block S116). In an optional substep of the first step, the wireless device 22 executes the client application 114, which provides the user data in reaction to the received input data provided by the host computer 24 (block S118). Additionally or alternatively, in an optional second step, the wireless device 22 provides user data (block S120). In an optional substep of the second step, the wireless device 22 provides the user data by executing a client application, such as, for example, client application 114 (block S122). In providing the user data, the executed client application 114 may further consider user input received from the user. Regardless of the specific manner in which the user data was provided, the wireless device 22 may initiate, in an optional third substep, transmission of the user data to the host computer 24 (block S124). In a fourth step of the method, the host computer 24 receives the user data transmitted from the wireless device 22, in accordance with the teachings of the embodiments described throughout this disclosure (block S126).

FIG. 8 is a flowchart illustrating an exemplary method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, in accordance with the teachings of the embodiments described throughout this disclosure, the network node 16 receives user data from the wireless device 22 (block S128). In an optional second step, the network node 16 initiates transmission of the received user data to the host computer 24 (block S130). In a third step, the host computer 24 receives the user data carried in the transmission initiated by the network node 16 (block S132).

Figure 9:
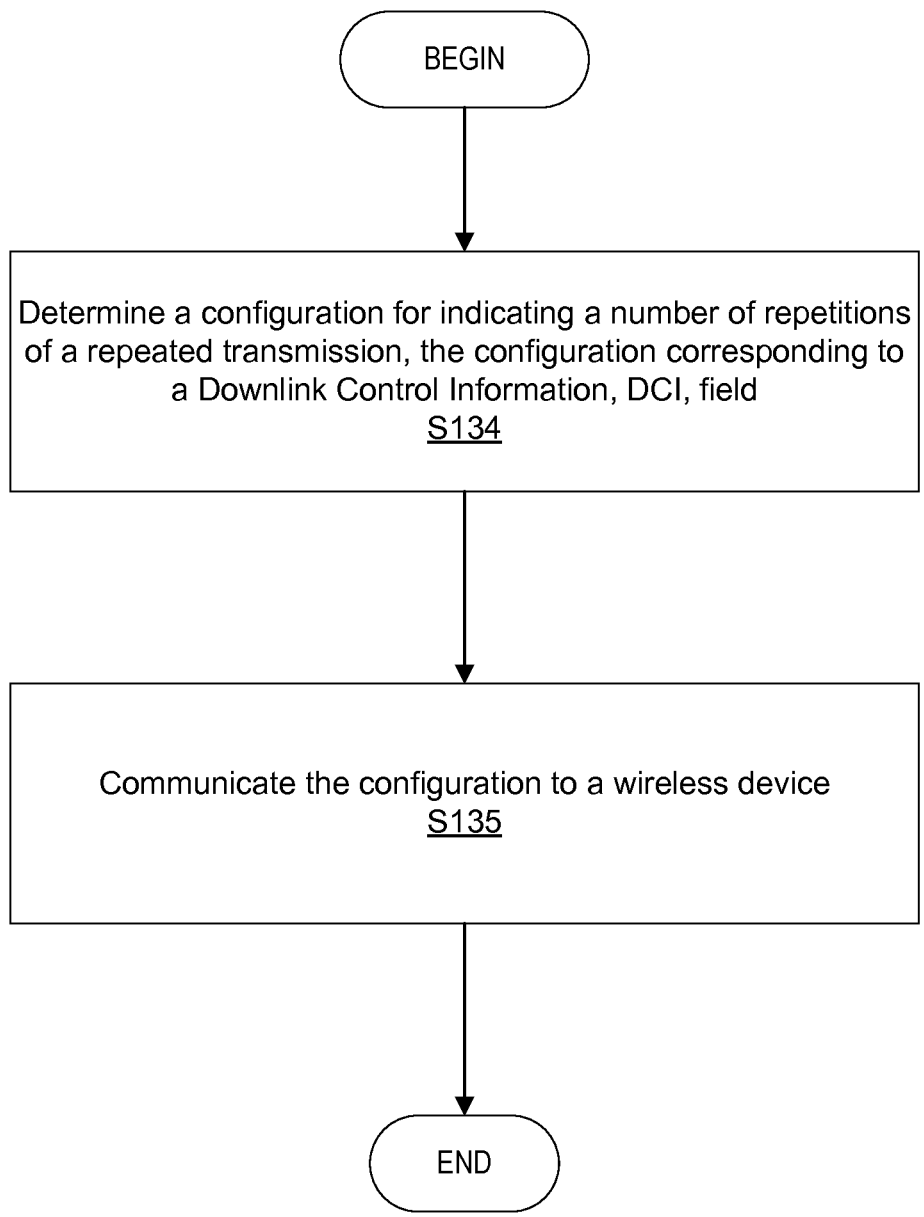
FIG. 9 is a flowchart of an exemplary process in a network node according to some embodiments of the present disclosure.

FIG. 9 is a flowchart of an exemplary process in a network node 16 according to an embodiment of the disclosure. One or more Blocks and/or functions and/or methods performed by the network node 16 may be performed by one or more elements of network node 16 such as by determination unit 32 in processing circuitry 68, processor 70, radio interface 62, etc. according to the example method(s). The process may include determining (block S134), such as via determination unit 32, processing circuitry 68 and/or radio interface 62, a configuration for indicating a number of repetitions of a repeated transmission, the configuration corresponding to a Downlink Control Information, DCI, field. The process may include communicating (block S135), such as via determination unit 32, processing circuitry 68 and/or radio interface 62, the configuration to the wireless device 22. In some embodiments, the method further comprises communicating, such as via determination unit 32, processing circuitry 68 and/or radio interface 62, the configuration is via Radio Resource Control, RRC, signaling. In some embodiments, the configuration comprises configuring a number of repetitions corresponding to a value in the DCI field. In some embodiments, the configuration corresponds to a 1-1 mapping of a value in the DCI field to a predefined number of repetitions. In some embodiments, the method further comprises communicating, such as via determination unit 32, processing circuitry 68 and/or radio interface 62, a DCI message, the DCI message comprising the value in the DCI field. In some embodiments, if a length of the DCI field is n bits, the number of different numbers of repetitions configurable or indicated by the network node is $2^n$ and at least one of the configurable number of repetitions is configured via Radio Resource Control, RRC, signaling. In some embodiments, the communicating the configuration further comprises communicating, such as via determination unit 32, processing circuitry 68 and/or radio interface 62, the configuration via Radio Resource Control, RRC, signaling, the RRC signaling comprising at least a first parameter and a second parameter configuring the number of repetitions of a downlink, DL, transmission and an uplink, UL, transmission, respectively. In some embodiments, the communicating the configuration is via Radio Resource Control, RRC, signaling, the RRC signaling comprising a parameter configuring the number of repetitions of a Physical Downlink Shared Channel, PDSCH, transmission. In some embodiments, the configuration of the number of repetitions is associated with a table, the table mapping values of the DCI field to repetition values.

In another example embodiment, the process includes determining an indication of a number of repetitions for a transmission, the transmission being associated with the wireless device 22; and communicating the indication of the number of repetitions to the wireless device via a Radio Resource Control (RRC) signaling. In some embodiments, the indication of the number of repetitions indicates a default number of repetitions associated with a Downlink Control Information (DCI) field used for example, for low latency communications. In some embodiments, if a length of the DCI field is n bits, the number of different numbers of repetitions which may be indicated by the network node is $2^n$ and at least one of the configurable number of repetitions is configured by the RRC signaling. In some embodiments, the RRC signaling includes at least a first parameter and a second parameter configuring the number of repetitions for a downlink (DL) transmission and an uplink (UL) transmission, respectively. In some embodiments, the indication of the number of repetitions includes a plurality of repetition values each configurable by a Downlink Control Information (DCI) field. In some embodiments, the indication of the number of repetitions is implemented in a table, the table mapping values of a Downlink Control Information (DCI) field to a plurality of repetition values.

Figure 10:
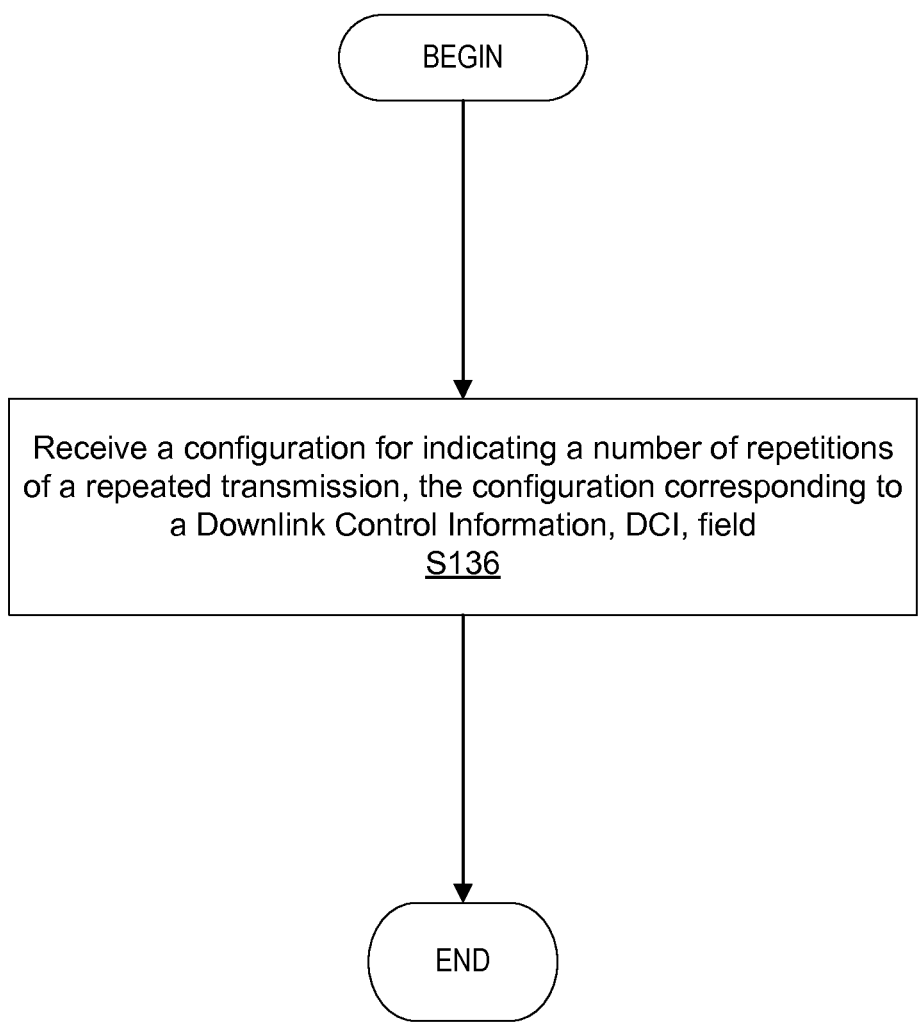
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more Blocks and/or functions and/or methods performed by wireless device 22 may be performed by one or more elements of wireless device 22 such as by repetition unit 34 in processing circuitry 84, processor 86, radio interface 82, etc. The method includes receiving (block S136), such as via repetition unit 34, processing circuitry 84, and/or radio interface 82, a configuration for indicating a number of repetitions of a transmission, e.g. a repeated transmission, the configuration corresponding to a Downlink Control Information, DCI, field. In some embodiments, the receiving the configuration is via Radio Resource Control, RRC, signaling. In some embodiments, the configuration comprises configuring a number of repetitions corresponding to a value in the DCI field. In some embodiments, the configuration corresponds to a 1-1 mapping of a value in the DCI field to a predefined number of repetitions. In some embodiments, the method further comprises receiving, such as via repetition unit 34, processing circuitry 84, and/or radio interface 82, a DCI message, the DCI message comprising the value in the DCI field; and receiving and decoding, such as via repetition unit 34, processing circuitry 84, and/or radio interface 82, a Physical Downlink Shared Channel, PDSCH, transmission based at least in part on a determined number of repetitions of the transmission, wherein the number of repetitions is based on the value in the DCI field. In some embodiments, if a length of the DCI field is n bits, the number of different numbers of repetitions configurable or possible to indicate by the network node 16 is $2^n$ and at least one of the configurable number of repetitions is configured via Radio Resource Control, RRC, signaling. In some embodiments, the receiving the configuration is via Radio Resource Control, RRC, signaling, the RRC signaling comprising at least a first parameter and a second parameter configuring the number of repetitions of a downlink, DL, transmission and an uplink, UL, transmission, respectively. In some embodiments, the receiving the configuration is via Radio Resource Control, RRC, signaling, the RRC signaling comprising a parameter configuring the number of repetitions of a Physical Downlink Shared Channel, PDSCH, transmission. In other examples the configuration is via Radio Resource Control, RRC, signaling, the RRC signaling comprising a parameter configuring the number of repetitions of a Physical Uplink Shared Channel, PUSCH, transmission. In some embodiments, the configuration is associated with a table, the table mapping values of the DCI field to repetition values.

In another embodiment, the method may include receiving a Radio Resource Control (RRC) signal including an indication; and recognizing the indication as an indication of a number of repetitions for a transmission associated with the wireless device 22. In some embodiments, the indication of the number of repetitions indicates a default number of repetitions associated with a Downlink Control Information (DCI) field used for the low latency communications. In some embodiments, if a length of the DCI field is n bits, the number of different numbers of repetitions configurable by the network node is $2^n$ and at least one of the configurable number of repetitions is configured by the RRC signaling. In some embodiments, the received RRC signal includes at least a first parameter and a second parameter configuring the number of repetitions for a downlink (DL) transmission and an uplink (UL) transmission, respectively. In some embodiments, the indication of the number of repetitions includes a plurality of repetition values each configurable by a Downlink Control Information (DCI) field. In some embodiments, the indication of the number of repetitions is implemented in a table stored in a memory of the wireless device 22, the table mapping values of a Downlink Control Information (DCI) field to a plurality of repetition values.

Having generally described some embodiments of the present disclosure related to control signaling for repetitions of transmissions, e.g. in a low latency communication (e.g. URLLC) environment, a more detailed description of some of the embodiments is described below.

Some embodiments of the disclosure operate on an assumption that the low latency communication requires a number of repetitions to be signaled for high reliability (e.g. URLLC). The repetitions may be signaled by, e.g., network node 16, in DCI. In some embodiments, the use of repetitions and/or the number of repetitions may be configured by RRC signaling (e.g., from network node 16 to wireless device 22). In one embodiment, the signaling can be an on/off Boolean switch, or it can represent a single bit that can be either high (1) or low (0).

In another embodiment, the RRC signaling can contain a default number of repetitions. In one aspect of such embodiment, the DCI field for the number of repetition(s) may include a special value pointing to the use of the default number. An example of the DCI field encoding is shown in Table 1 below. Note that the number of different numbers of configurable repetitions and the number of bits in the DCI field is not necessarily limited to the example shown in Table 1 (with 2 bits corresponding to 4 different configurable repetition values) and can be generalized to n bits and $2^n$ values. For example, if there are n=2 and $2^2$=4, there are 4 choices e.g., {1, 2, 3, 6} for the number of repetitions. Therefore, with n bits there may be $2^n$ different choices of the number of repetitions (e.g., in the example the four choices are 1, 2, 3 or 6 repetitions).

Table 1 shows example of field values corresponding to the number of repetitions for an exemplary DCI field using at least one RRC-configured default value and wherein the other values in the DCI field provide a 1-1 mapping to a predefined number of repetitions.

TABLE 1

| Field Value | Repetitions |
|---|---|
| 00 | No repetitions |
| 01 | 1 additional transmission |
| 10 | 2 additional transmission |
| 11 | Default number of additional transmissions, RRC-configured |

In yet another embodiment, the RRC signaling may be different for both the uplink and the downlink. Stated another way, some embodiments may include two RRC signaled parameters, with each parameter separately enabling/disabling repetitions, and/or separately indicating a number of repetitions in the uplink (UL) and downlink (DL).

In yet another embodiment, the RRC signaling may configure repetitions both for the UL and DL. In yet another embodiment, the RRC signaling may entirely configure the meaning of the DCI bits corresponding to the DCI field to a set of values as shown in Table 2 below.

Table 2 illustrates an example embodiment where the meaning or indication of a signaled value of the DCI field may be an RRC-configured value, where the table includes entirely RRC-configured repetition values, i.e. no predefined numbers of repetitions

TABLE 2

| Field Value | Meaning/Indication |
|---|---|
| 00 | RRC Configured value v1 |
| 01 | RRC Configured value v2 |
| 10 | RRC Configured value v3 |
| 11 | RRC Configured value v4 |

As shown in the examples in Tables 1 and 2, the format of the DCI is an example of a configuration for indicating a number of repetitions of a repeated transmission.

Some embodiments of the present disclosure may include one or more of the following steps, described from the perspective of the wireless device 22:

a) wireless device 22 receives signaling (e.g., RRC signaling from the network node 16). In some embodiments, the RRC signaling can include one or more RRC-configured repetition values as described above.

b) wireless device 22 monitors or searches for the configured DCI format on PDCCH.

c) wireless device 22 reads or determines certain fields of the DCI. In some embodiments, at least one DCI field may be provided according to one or more of the formats described above (e.g., Table 1 and/or Table 2). In some embodiments, the received RRC signaling can be used to determine one or more RRC-configured repetition values indicated by the read/determined field value in the DCI field.

d) wireless device 22 identifies to which Modulation and Coding Scheme (MCS) and Hybrid Automatic Repeat reQuest (HARQ) process the PDSCH/PUSCH transmission will belong to.

e) wireless device 22 receives the PDSCH transmission (or transmits the PUSCH transmission), demodulates, decodes and stores such transmission into a buffer according to at least the identified MCS and/or HARQ information. In some embodiments, the wireless device 22 may use the repetition value indicated by the DCI field to handle reception of the repeated transmission. For example, using the repetition value in the DCI field, the wireless device 22 may receive, demodulate, decode and store multiple, repeated PDSCH transmissions and compare the same to ensure high reliability of the data received. Repetition of transmissions may be useful in, for example, low latency and/or high reliability communications where the wireless device does not have enough time to process and provide HARQ feedback for the data.

In some embodiments, the repetitions discussed may be considered retransmissions or repeat transmissions of the same message, signal, packet, data, information, or the like, for high reliability low latency communications (e.g. URLLC). Some embodiments provide for a control signaling (e.g., an RRC notification) of the repetition number field that may advantageously avoid having to create new DCI formats.

For a wireless device 22, different sets of resources may be configured for control information and/or transmission on a physical control channel like PUCCH or PSCCH. The sets may be configured with control signaling, in particular RRC layer signaling and/or semi-statically, e.g. by a signaling radio node or node arrangement (e.g., network node 16). Each set may comprise one or more resources. Different sets may comprise different numbers of resources, or the same. A resource may be an indicatable resource, and/or may be pointed to an indicator, which may be transmitted in control signaling by e.g., network node 16, to be received by the wireless device 22. Such an indicator may for example be a DCI or UCI pointer or other indicator. The (maximum) number of resources in a set (indicatable resources) may correspond to the number of resources indicatable with such an indicator, e.g. based in its size in bits. For example, the number may be a multiple or power of 2, e.g. 2 or 4. Each set may be associated to a control information size class and/or an associated format. The size class may for example indicate a payload size for the information, or a part thereof, e.g. acknowledgement information, and/or a range of sizes. One or more of the size classes and/or ranges may be configurable, e.g. semi-statically or with RRC signaling. In some embodiments, the payload may include, for example, PUCCH information, PUSCH information, uplink control information (UCI), a DMRS, etc.

A transmission resource may be a time and/or frequency resource, e.g. a resource element or a group of resource elements. A resource may extend in time over one or more symbols, e.g. within a slot or in some cases, across one or more slot boundaries. It may be considered that a resource extends in time over one or more subcarriers, and/or one or more physical resource blocks. In some cases, a resource may be equal or shorter in time domain than a slot duration (which may be 14 symbols, or another value, e.g. a value below 20 symbols). A resource may be configured for, and/or be associated to, a channel, e.g. a control channel, which may be a physical channel, e.g. a PUCCH or PDCCH, and/or for a specific type of control information or signaling. One or more specific transmission message formats may be associated to a resource. Such a format may for example specify payload size and/or size range, and/or structure, and/or modulation and coding, and/or repetition rate and/or code rate and/or duration of transmission, e.g. of a message. A resource may be larger (in time and/or frequency) than necessary to carry associated and/or configured control information.

In some embodiments, a set of resources, and/or the sets of resources, may be configured by e.g., network node 16, with one or more messages, e.g. semi-statically and/or with RRC signaling, and/or dynamically, e.g. with physical layer signaling, like DCI or UCI signaling. It may be considered that a set of resources is configured with semi-static and/or RRC layer signaling, and one of the resources may be indicated (configured) with dynamic and/or physical layer signaling. This may particularly be performed for resource/s associated to, and/or configured for, acknowledgement information. Generally, it may be considered that the network, e.g. a signaling radio node and/or node arrangement (e.g., network node 16), configures a wireless device 22, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving control information may comprise receiving one or more control information messages. It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., the indication of the number of repetitions) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a radio node, in particular a terminal or wireless device (e.g., wireless device 22), may refer to the radio node being adapted or caused or set and/or instructed to operate according to the configuration. Configuring may be done by another device, e.g., a network node (e.g., network node 16) (for example, a base station or gNB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

In addition, some embodiments may include one or more of the following examples:

Example A1. A network node configured to communicate with a wireless device (wireless device), the network node configured to, and/or comprising a radio interface and/or comprising processing circuitry configured to:

determine an indication of a number of repetitions for a transmission, the transmission being associated with the wireless device; and communicate the indication of the number of repetitions to the wireless device via a Radio Resource Control (RRC) signaling.

Example A2. The network node of Example A1, wherein the indication of the number of repetitions indicates a default number of repetitions associated with a Downlink Control Information (DCI) field used for Ultra-Reliable Low-Latency Communication (URLLC).

Example A3. The network node of Example A2, wherein if a length of the DCI field is n bits, the number of repetitions configurable by the network node is $2^n$ and at least one of the configurable number of repetitions is configured by the RRC signaling.

Example A4. The network node of any of Examples A1-A3, wherein the RRC signaling includes at least a first parameter and a second parameter configuring the number of repetitions for a downlink (DL) transmission and an uplink (UL) transmission, respectively.

Example A5. The network node of any of Examples A1-A4, wherein the indication of the number of repetitions includes a plurality of repetition values each configurable by a Downlink Control Information (DCI) field.

Example A6. The network node of any of Examples A1-A5, wherein the indication of the number of repetitions is implemented in a table, the table mapping values of a Downlink Control Information (DCI) field to a plurality of repetition values.

Example B1. A method implemented in a network node, the method comprising: determining an indication of a number of repetitions for a transmission, the transmission being associated with the wireless device; and communicating the indication of the number of repetitions to the wireless device via a Radio Resource Control (RRC) signaling.

Example B2. The method of Example B1, wherein the indication of the number of repetitions indicates a default number of repetitions associated with a Downlink Control Information (DCI) field used for Ultra-Reliable Low-Latency Communication (URLLC).

Example B3. The method of Example B2, wherein if a length of the DCI field is n bits, the number of repetitions configurable by the network node is $2^n$ and at least one of the configurable number of repetitions is configured by the RRC signaling.

Example B4. The method of any of Examples B1-B3, wherein the RRC signaling includes at least a first parameter and a second parameter configuring the number of repetitions for a downlink (DL) transmission and an uplink (UL) transmission, respectively.

Example B5. The method of any of Examples B1-B4, wherein the indication of the number of repetitions includes a plurality of repetition values each configurable by a Downlink Control Information (DCI) field.

Example B6. The method of any of Examples B1-B5, wherein the indication of the number of repetitions is implemented in a table, the table mapping values of a Downlink Control Information (DCI) field to a plurality of repetition values.

Example C1. A wireless device (wireless device) configured to communicate with a network node, the wireless device configured to, and/or comprising a radio interface and/or processing circuitry configured to:

receive a Radio Resource Control (RRC) signal including an indication; and recognize the indication as an indication of a number of repetitions for a transmission associated with the wireless device.

Example C2. The wireless device of Example C1, wherein the indication of the number of repetitions indicates a default number of repetitions associated with a Downlink Control Information (DCI) field used for Ultra-Reliable Low-Latency Communication (URLLC).

Example C3. The wireless device of Example C1, wherein if a length of the DCI field is n bits, the number of repetitions configurable by the network node is $2^n$ and at least one of the configurable number of repetitions is configured by the RRC signaling.

Example C4. The wireless device of any of Examples C1-C3, wherein the received RRC signal includes at least a first parameter and a second parameter configuring the number of repetitions for a downlink (DL) transmission and an uplink (UL) transmission, respectively.

Example C5. The wireless device of any of Examples C1-C4, wherein the indication of the number of repetitions includes a plurality of repetition values each configurable by a Downlink Control Information (DCI) field.

Example C6. The wireless device of any of Examples C1-05, wherein the indication of the number of repetitions is implemented in a table stored in a memory of the wireless device, the table mapping values of a Downlink Control Information (DCI) field to a plurality of repetition values.

Example D1. A method implemented in a wireless device (wireless device), the method comprising:

receiving a Radio Resource Control (RRC) signal including an indication; and recognizing the indication as an indication of a number of repetitions for a transmission associated with the wireless device.

Example D2. The method of Example D1, wherein the indication of the number of repetitions indicates a default number of repetitions associated with a Downlink Control Information (DCI) field used for Ultra-Reliable Low-Latency Communication (URLLC).

Example D3. The method of Example D1, wherein if a length of the DCI field is n bits, the number of repetitions configurable by the network node is $2^n$ and at least one of the configurable number of repetitions is configured by the RRC signaling.

Example D4. The method of any of Examples D1-D3, wherein the received RRC signal includes at least a first parameter and a second parameter configuring the number of repetitions for a downlink (DL) transmission and an uplink (UL) transmission, respectively.

Example D5. The method of any of Examples D1-D4, wherein the indication of the number of repetitions includes a plurality of repetition values each configurable by a Downlink Control Information (DCI) field.

Example D6. The method of any of Examples D1-D5, wherein the indication of the number of repetitions is implemented in a table stored in a memory of the wireless device, the table mapping values of a Downlink Control Information (DCI) field to a plurality of repetition values.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
3GPP 3rd Generation Partnership Project
AL Aggregation Level
CCE Control Channel Elements
CQI Channel Quality Indicator
DCI Downlink Control Information
DL Downlink
HARQ Hybrid Automatic Repeat Request
LTE Long Term Evolution
MCS Modulation and Coding Scheme
NR New Radio
PDCCH Physical Downlink Control Channel
PDSCH Physical Downlink Shared Channel
PUSCH Physical Uplink Shared Channel
RRM Radio Resource Management
RV Redundancy Version
UE User Equipment
UL Uplink
URLLC Ultra Reliable Low Latency Communication
WD Wireless Device It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a network node for enabling a repeated transmission, the network node configured to communicate with a wireless device and to schedule a plurality of resources in a single scheduling message for the repeated transmission, the method comprising:
   determining a configuration for indicating the number of repetitions of the transmission, the configuration corresponding to a Downlink Control Information, DCI, field; and
   enabling the configuration with a parameter in a Radio Resource Control, RRC, signaling message; and
   communicating a DCI message to the wireless device, the DCI message comprising a value in the DCI field in accordance with the configuration,
   wherein the repeated transmission is for a high reliability and low latency communication transmission,
   wherein if a length of the DCI field is n bits, $2^n$ different numbers of repetitions are configurable,
   wherein the DCI message is based on an existing DCI format according to Long Term Evolution, LTE, standards and/or based on an existing DCI format according to New Radio, NR, standards.

2. The method of claim 1, wherein the configuration comprises indicating whether the number of repetitions is provided by a value in the DCI field or whether the number of repetitions is defined by an RRC parameter.

3. The method of claim 1, further comprising configuring the number of repetitions via an RRC signaling parameter when the configuration for indicating a number of repetitions comprises the number being defined by the RRC parameter.

4. The method of claim 2, wherein the configuration corresponds to a 1-1 mapping of a value in the DCI field to a predefined number of repetitions.

5. The method of claim 1, wherein at least one of the configurable number of repetitions is configured via Radio Resource Control, RRC, signaling.

6. The method of claim 1, wherein the configuration of the number of repetitions is associated with a table, the table mapping values of the DCI field to repetition values.

7. A method performed by a wireless device configured to communicate with a network node for a repeated transmission, the method comprising:
receiving, via a radio resource configuration, RRC, parameter, an indication enabling the configuration of the number of repetitions of a transmission; and
receiving a DCI message, the DCI message comprising a value in the DCI field in accordance with the configuration,
wherein the repeated transmission is for a high reliability and low latency communication transmission,
wherein if a length of the DCI field is n bits, $2^n$ different numbers of repetitions are configurable,
wherein the DCI message is based on an existing DCI format according to Long Term Evolution, LTE, standards and/or based on an existing DCI format according to New Radio, NR, standards.

8. The method of claim 7, wherein the configuration comprises indicating whether the number of repetitions is provided by a value in the DCI field or whether the number of repetitions is defined by an RRC.

9. The method of claim 8, wherein the configuration corresponds to a 1-1 mapping of a value in the DCI field to a predefined number of repetitions.

10. The method of claim 8, further comprising receiving the number of repetitions via an RRC signaling parameter when the configuration for indicating a number of repetitions comprises the number being defined by the RRC parameter.

11. The method of claim 7, wherein at least one of the configurable number of repetitions is configured via Radio Resource Control, RRC, signaling.

12. The method of claim 7, wherein the configuration is associated with a table, the table mapping values of the DCI field to repetition values.

13. A network node configured for enabling a repeated transmission, the network node configure to communicate with a wireless device and to schedule a plurality of resources in a single scheduling message for the repeated transmission, the network node comprising processing circuitry, the processing circuitry configured to:
determine a configuration for indicating the number of repetitions for the transmission, the configuration corresponding to a Downlink Control Information, DCI, field; and
enable the configuration with a parameter in a Radio Resource Control, RRC, signaling message; and
communicate a DCI message to the wireless device, the DCI message comprising a value in the DCI field in accordance with the configuration,
wherein the repeated transmission is for a high reliability and low latency communication transmission,
wherein if a length of the DCI field is n bits, $2^n$ different numbers of repetitions are configurable,
wherein the DCI message is based on an existing DCI format according to Long Term Evolution, LTE, standards and/or based on an existing DCI format according to New Radio, NR, standards.

14. The network node of claim 13, wherein the configuration comprises indicating whether the number of repetitions is provided by a value in the DCI field or whether the number of repetitions is defined by an RRC parameter.

15. The network node of claim 14, wherein the processing circuitry is further configured to configure the number of repetitions via an RRC signaling parameter when the configuration for indicating a number of repetitions comprises the number being defined by the RRC parameter.

16. The network node of claim 14 wherein the configuration comprises a 1-1 mapping of a value in the DCI field to a predefined number of repetitions.

17. The network node of claim 14 wherein at least one of the configurable number of repetitions is configured via Radio Resource Control, RRC, signaling.

18. The network node of claim 13, wherein the configuration is associated with a table, the table mapping values of the DCI field to repetition values.

19. A wireless device configured to communicate with a network node, and the network node scheduling a plurality of resources in a single scheduling message for a repeated transmission, the wireless device comprising processing circuitry and a radio interface in communication with the processing circuitry, the radio interface configured to:
receive, via a radio resource configuration, RRC, parameter, an indication enabling the configuration of the number of repetitions of a transmission; and
receive a DCI message, the DCI message comprising a value in the DCI field in accordance with the configuration,
wherein the repeated transmission is for a high reliability and low latency communication transmission,
wherein if a length of the DCI field is n bits, $2^n$ different numbers of repetitions are configurable,
wherein the DCI message is based on an existing DCI format according to Long Term Evolution, LTE, standards and/or based on an existing DCI format according to New Radio, NR, standards.

20. The wireless device of claim 19, wherein the configuration comprises indicating whether the number of repetitions is provided by a value in the DCI field or whether the number of repetitions is defined by an RRC.

21. The wireless device of claim 20, wherein:
the radio interface is further configured to:
receive the number of repetitions via an RRC signaling parameter when the configuration for indicating a number of repetitions comprises the number being defined by the RRC parameter; and optionally
receive a Physical Downlink Shared Channel, PDSCH, transmission; and
the processing circuitry is configured to decode the Physical Downlink Shared Channel, PDSCH, transmission based at least in part on a determined number of repetitions of the transmission, wherein the number of repetitions is based on the configuration.

22. A computer program or a computer program product or storage medium comprising a computer program, the computer program comprising instructions which when executed on a processor, cause the processor to perform the method of claim 1.

* * * * *